Oct. 22, 1935.  C. B. ROBINSON  2,018,575
ONION SET HARVESTER
Filed June 21, 1935  2 Sheets-Sheet 1

WITNESSES

INVENTOR
Charles B. Robinson
BY
ATTORNEYS

Oct. 22, 1935.   C. B. ROBINSON   2,018,575
ONION SET HARVESTER
Filed June 21, 1935   2 Sheets-Sheet 2

WITNESSES

INVENTOR
Charles B. Robinson
BY
ATTORNEYS

Patented Oct. 22, 1935

2,018,575

UNITED STATES PATENT OFFICE 2,018,575

ONION SET HARVESTER

Charles B. Robinson, Georges Mills, N. H.

Application June 21, 1935, Serial No. 27,799

8 Claims. (Cl. 55—50)

This invention relates to onion set harvesters and while it is adapted for harvesting onions of any size, and other articles for that matter, the article will be hereinafter referred to as onions to avoid constant repetition.

An object of the invention is to provide a harvester of this character having an improved construction and arrangement of drum wheel into which the onions and the earth are directed and carried upwardly by the drum wheel and deposited in a hopper from which they are directed into a rotary tapering or frusto-conical drum and are caused to move longitudinally through the drum to remove all dirt from the onions and deposit the onions free from dirt at one end of the drum.

A further object is to provide an apparatus of this character which can be drawn by draft animals, or other means, and which will function to cut off the tops of the onions, dig the onions out of the ground, thoroughly free the onions from dirt, and deposit them in a clean manner at the outlet end of the machine.

A further object is to provide a machine of this character which is of comparatively simple construction and which will be strong and durable in use.

With these and other objects in view the invention consists in certain novel features of construction and combinations and arrangements of parts, all of which will be more fully hereinafter described and pointed out in the claims.

In the accompanying drawings—

Figure 1:
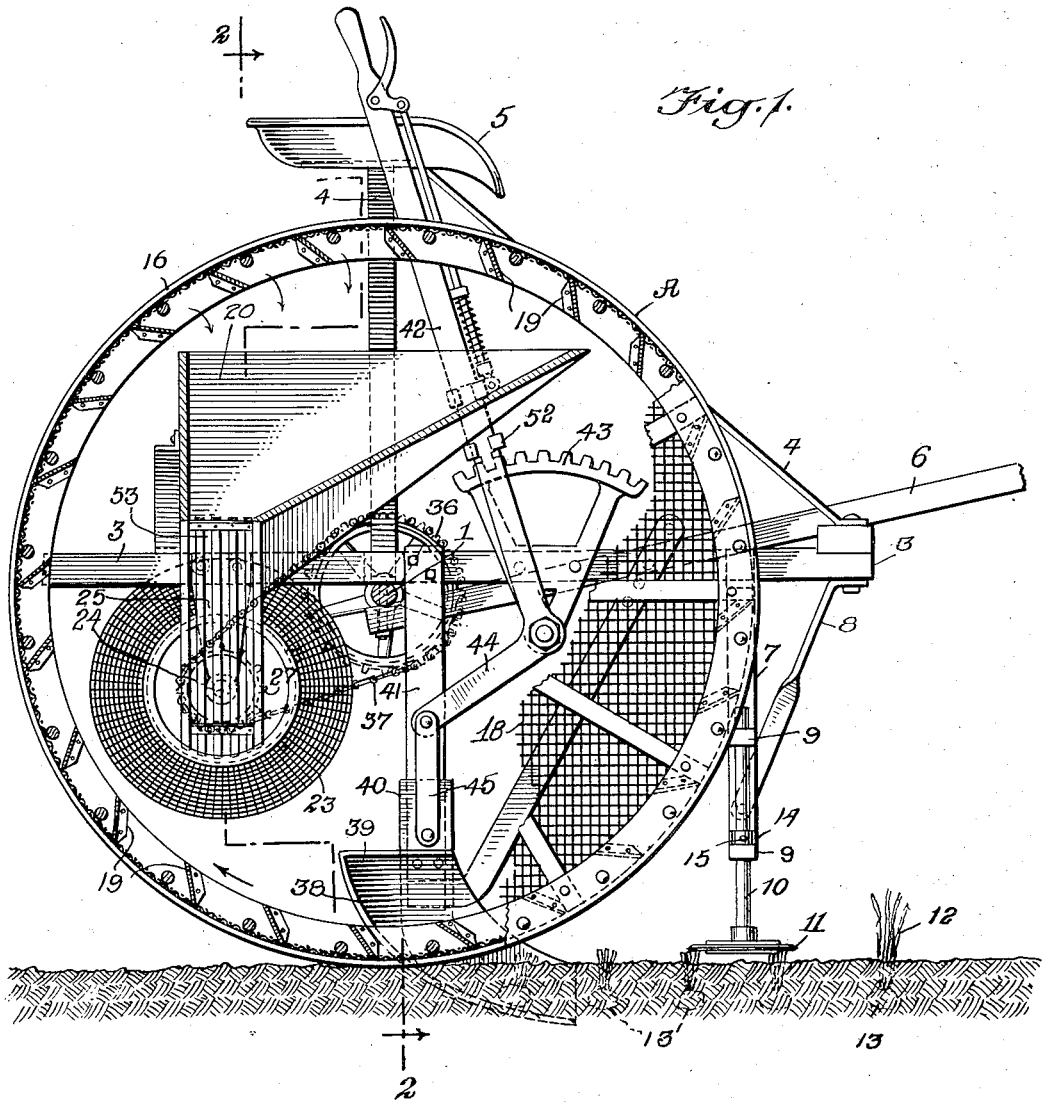
Figure 1 is a view in vertical longitudinal section, the view being taken on the line 1, 1 of Figure 2.
Figure 2:
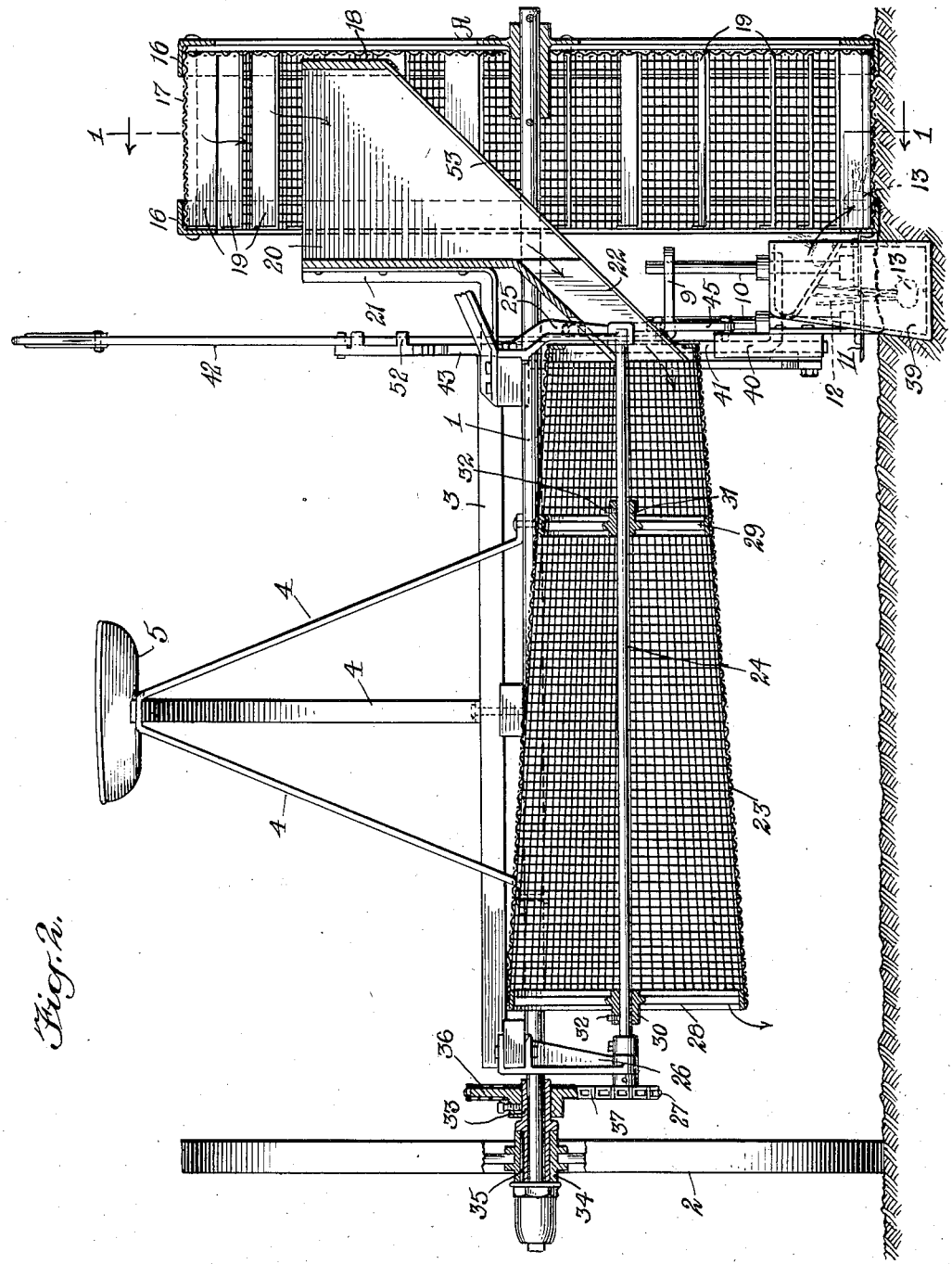
Figure 2 is a view in transverse section through the machine, the view being taken mainly on the staggered line 2, 2 of Figure 1.

1 represents the axle of the machine which is supported at one end in my improved wheel drum A, and at its other end in an ordinary wheel 2.

A suitable frame 3 is provided with a series of connected uprights 4 providing a mounting for a driver's seat 5, and a forwardly projecting tongue 6 is secured to the frame for the attachment of any suitable draft animal or device. Depending bars 7 are fixed to the forward portion of frame 3 near one side of the frame and are strengthened by braces 8. These bars 7 have bearings 9 thereon in which vertical shafts 10 are mounted to turn and these shafts 10 at their lower ends carry rotary cutting disks 11, so that said disks constitute what is known in the art as a self-rotating colter to cut the tops 12 of the growing onions 13. These shafts 9 are capable of vertical adjustment and they have collars 14 thereon secured by clamping screws 15 to the shafts and resting on the lower bearings 9 to maintain the disks at proper elevation relative to the ground.

My improved wheel drum A consists of a pair of facing angle iron rings 16 which are connected by a cylindrical screen 17, and the outer ring 16 has a screen constituting a disk 18 closing the outer face or portion of the drum. The inner portion of the drum is open, but between the rings 16 transversely extending blades or vanes 19 are provided which constitute buckets to convey the onions upwardly as the drum wheel revolves and deposit the onions into a hopper 20 which is supported from the frame 3 by means of any suitable form of braces or brackets 21. This hopper 20 has an outlet chute 22 which discharges into the smaller end of a horizontally positioned frusto-conical screen drum 23 extending transversely of the machine. This drum 23 has a central shaft 24 extending through the same and mounted at one end in a bearing bracket 25 fixed to frame 3. The other end of the shaft 24 extends through a bearing bracket 26 depending from frame 3 and has a sprocket wheel 27 fixed thereon. The drum 23 is provided at its open end and intermediate its ends with spider wheels 28 and 29 respectively. The hubs 30 and 31 respectively of the spiders 28 and 29 are secured to the shaft 24 and I have shown for this purpose ordinary set screws 32.

A sleeve 33 is mounted on the axle 1 within the hub 34 of wheel 2 and is keyed to the hub 34 as shown at 35 so that the sleeve is compelled to turn when the wheel 2 turns. A sprocket wheel 36 is secured on the sleeve 33 and is connected by a sprocket chain 37 with sprocket wheel 27 so that as the wheel 2 turns rotary motion is transmitted to the drum 24. The reference character 38 is used to indicate generally a plow which plows through the ground under the onions and lifts the same and the onions, and this plow is provided with a mold board 39 which deflects the onions and the earth laterally into the wheel drum A. The plow 38 is secured to an angular sleeve 40 mounted to move vertically on the depending bar 41 fixed to frame 3 and is raised and lowered through the medium of a hand lever 42. This hand lever 42 is pivoted to a tooth segment 43 and has an angle arm 44 extending from its pivot and connected by a link 45 with sleeve 40 so that when the hand lever 42, which is convenient to the driver's seat 5, is moved in one direction the plow will be elevated to allow the machine to move over the ground without the plow contacting therewith. To hold the plow in any suitable position of adjustment, the sleeve 42 is provided with the ordinary spring pressed detent 52 engaging the tooth segment 43.

The operation of the machine is as follows:

Assuming the parts to be in their normal operative position as illustrated in the drawings, the machine is drawn over the ground and the self-revolving colter 11 cuts off the tops of the onions while the plow 38 lifts the onions and the soil or earth and causes the same to move laterally into the wheel drum A. As the wheel drum A revolves, the blades or vanes 19 carry the onions toward the top of the wheel and drop them into hopper 20, and from the hopper 20 the onions are directed through chute 22 into the smaller end of drum 24, and as this drum 24 is rotating the onions are caused to move longitudinally thereof to the open larger end thereof where they fall onto the ground or into any suitable receptacle as may be desired.

From the time the onions enter the drum wheel A until they escape from the drum 24, they are subject not only to the rotary action of these parts, but they are subject also to the vibration to which such a machine is necessarily subjected, and hence all of the earth and foreign matter is freed from the onions and they escape from the drum 24 perfectly cleaned and ready for use.

In order that every opportunity may be given for the earth to escape from the onions, it is preferable to provide the bottom of the hopper 20 and the chute 22 in the form of spaced slats 53 between which the dirt can escape as the onions move down the chute.

While I have illustrated and described what I believe to be a preferred embodiment of my invention, it is obvious that various changes might be made in the general form and arrangement of parts without departing from my invention, and hence I do not limit myself to the precise details set forth but consider myself at liberty to make such changes and alterations as fairly fall within the spirit and scope of the appended claims.

I claim:

1. An onion harvester including an axle, a wheel supporting the axle at one end, a screened drum wheel supporting the axle at the other end and open at one side, means for depositing onions and earth into the open drum wheel, and blades or vanes in the drum wheel adapted as the drum wheel revolves to carry the onions upwardly, shake the earth therefrom and deposit them.

2. An onion harvester including an axle, a wheel supporting one end of the axle, a screened drum wheel supporting the other end of the axle, means for removing onions from the ground and depositing them in the drum wheel, a screened drum extending transversely of the machine and blades or vanes in the drum wheel for conveying the onions to a point for deposit in the drum.

3. An onion harvester including an axle, a wheel supporting one end of the axle, a screened drum wheel supporting the other end of the axle, means for removing onions from the ground and depositing them in the drum wheel, a screened drum extending transversely of the machine and blades or vanes in the drum wheel for conveying the onions to a point for deposit in the drum, and a hopper extending into the upper portion of the drum wheel receiving the onions therefrom and directing the same into the drum.

4. An onion harvester including an axle, a wheel supporting one end of the axle, a screened drum wheel supporting the other end of the axle, a transversely extending frusto-conical screened drum supported by the axle, means imparting rotary motion to the drum, means for depositing onions and earth into the drum wheel, and means for directing the onions from the drum wheel into the drum.

5. An onion harvester including an axle, a wheel supporting one end of the axle, a screened drum wheel supporting the other end of the axle, a frame on the axle, a plow secured to the frame and adapted to dig onions from the ground and deposit them into the drum wheel, a self-revolving colter carried with the frame and adapted to cut the onion tops in advance of the plow, a transversely extending screened drum and a hopper carried by the frame receiving onions from the drum wheel and directing them into the drum.

6. An onion harvester including an axle, a wheel supporting one end of the axle, a screened drum wheel supporting the other end of the axle, a frame on the axle, a plow secured to the frame and adapted to dig onions from the ground and deposit them into the drum wheel, a self-revolving colter carried with the frame and adapted to cut the onion tops in advance of the plow, a transversely extending screened drum and a hopper carried by the frame receiving onions from the drum wheel and directing them into the drum, a shaft secured to turn with the drum, a sleeve on the axle fixed to turn with the first mentioned wheel, and means operatively connecting the sleeve and the shaft of the drum whereby when the wheel moves over the ground rotary motion will be imparted to the drum.

7. An onion harvester including an axle, a wheel supporting one end of the axle, a screened drum wheel supporting the other end of the axle, bearing brackets depending from the frame, a shaft mounted to turn in the bearing brackets, a frusto-conical screened drum open at both ends, spider wheels in the drum secured to the shaft, a sprocket wheel on the shaft, a sprocket wheel turned by the first mentioned wheel, a sprocket chain connecting the sprocket wheels and a hopper carried by the frame and receiving onions from the drum wheel and directing them into the drum.

8. An onion harvester including an axle, a wheel supporting one end of the axle, a screened drum wheel supporting the other end of the axle, bearing brackets depending from the frame, a shaft mounted to turn in the bearing brackets, a frusto-conical screened drum open at both ends, spider wheels in the drum secured to the shaft, a sprocket wheel on the shaft, a sprocket wheel turned by the first mentioned wheel, a sprocket chain connecting the sprocket wheels and a hopper carried by the frame and receiving onions from the drum wheel and directing them into the drum, a bar depending from the frame, a plow adjustably mounted on the bar and adapted to remove onions from the ground and deposit them into the drum wheel, and a hand lever adapted to adjust said plow vertically on the bar.

CHARLES B. ROBINSON.